United States Patent [19]

Oas et al.

[11] 4,011,039
[45] Mar. 8, 1977

[54] PARISON TRANSFER DEVICE
[75] Inventors: David C. Oas, Downington, Pa.; Waldemar E. Kmentt, Beloit, Wis.
[73] Assignee: Beloit Corporation, Beloit, Wis.
[22] Filed: Apr. 7, 1975
[21] Appl. No.: 565,361
[52] U.S. Cl. .................. 425/397; 425/DIG. 213
[51] Int. Cl.² ........................... B29C 17/07
[58] Field of Search ...... 425/387 B, 397, DIG. 213, 425/DIG. 216; 74/29–34, 110

[56] References Cited
UNITED STATES PATENTS

| | | | |
|---|---|---|---|
| 2,867,058 | 1/1959 | Balsiger et al. | 51/105 SP |
| 3,010,328 | 11/1961 | Forey | 74/110 |
| 3,566,441 | 3/1971 | Thorn et al. | 425/DIG. 213 |
| 3,758,254 | 9/1973 | Dean | 425/387 B |
| 3,790,319 | 2/1974 | Hudson et al. | 425/387 B |

*Primary Examiner*—Richard B. Lazarus
*Attorney, Agent, or Firm*—Larson, Taylor and Hinds

[57] ABSTRACT

A carriage, including a parison holding device, is mounted for movement between the oven and the mold to transfer a parison therebetween. A power actuated device such as a piston and cylinder unit has an actuated element connected to the carriage through a displacement multiplication arrangement so that the carriage moves a greater distance then the actuated element, thereby increasing the displacement of and reducing the acceleration forces on the carriage relative to the actuated element.

18 Claims, 6 Drawing Figures

PARISON TRANSFER DEVICE

BACKGROUND OF THE INVENTION

This invention relates to the molding of articles from plastic preforms, and in particular it relates to a new and improved apparatus for transferring heated parisons from the oven to the molding means such as a blow mold or the like.

Certain molding techniques such as vacuum molding, blow molding or the like start with a preform of moldable material such as plastic or the like, which preform is commonly referred to as a parison, wherein during the molding procedure the preform is reshaped into a finished article on or within the mold. Such preforms can take many different shapes such as a disc or a tube. While the present invention is adaptable for use with any type of parison, it is particularly concerned with tubular parisons, and hence the invention will be specifically described with respect to its use in connection with tubular parisons.

Tubular parisons are formed and heated to a temperature suitable for molding such as blow molding in two different ways. According to one procedure, a parison is extruded in a hot state and while still hot it is carried over to the blow mold. In accordance with another procedure, the extruded parisons are cooled and/or stored for use at a subsequent time and/or place. This latter procedure is referred to as the "cold parison" procedure because it starts with a cold (i.e. room temperature) parison which must be heated to a temperature suitable for blow molding. The present invention is concerned with either of these methods since in either method the problem arises of transferring a heated parison to the mold. However, the transfer problem is somewhat greater in the cold parison procedure and hence the present invention will be specifically described with respect to this procedure. A suitable method and apparatus for carrying out the cold parison technique is described in detail in the assignee's previous U.S. Pat. No. 3,765,813, issued OCT. 16, 1973, and the disclosure thereof is incorporated by reference herein for details of a typical cold parison technique. In the cold parison apparatus, as described in said patent, the parisons are heated within an oven, in which parisons are supported in an upright position on carrier pins as they travel through the oven. The oven is designed and operated such that as the parisons reach the suitable forming temperature they arrive at a discharge station at which a transfer means having some type of gripping structure enters the oven from above through an opening, grips a properly heated parison, removes the parison upwardly out of the oven and then transfers the parison laterally to the blow mold whereat the parison is lowered. In the type of operation with which the said previous patent is concerned, as the parison is lowered, its lower end is gripped by a clamp located beneath the level of the mold while the transfer means still grips the upper end of the mold. The transfer means is then raised to thereby stretch the parison for biaxial orientation thereof. Hence, the transfer means including its gripper means has a multiple function of gripping the parison at the oven and removing therefrom, carrying the parison to the blow mold, lowering the parison such that its lower end is properly positioned with respect to its clamp and then effecting stretching of the parison. In contrast to the rotating arm transfer means as described in the said patent, there has been developed a transfer means comprising a carriage mounted on a horizontal rod for linear movement between the oven and the mold, the rod itself being movable vertically along upright frame means to permit raising and lowering of the carriage containing the gripper means at the oven and at the mold. In these arrangements the carriage further includes a fluid operated cylinder for opening and closing the gripping fingers of the gripper means. Transfer means of this type are shown in commonly owned copending U.S. applications Ser. Nos. 496,309, filed Aug. 9, 1974 and now abandoned in favor of Ser. No. 667,459 and 509,150, filed Sept. 25, 1974 and now U.S. Pat. No. 3,981,673.

However, even with the improved transfer means as described in the above mentioned pending applications, certain problems remain. Given a necessary relative positioning of the oven and the blow mold, the distance from the discharge station of the oven to the blow mold must necessarily be relatively great, i.e. great enough that the time required to transfer the parison between these two points is long enough that the parison cools down during this transfer time by an amount which adversely affects the precise heating profile of the parison. Also, the power means provided for effecting this transfer over this relatively long distance tends to be somewhat complex. On the other hand, however, these problems are not solved by simply providing a larger and faster power means since this would tend to increase the acceleration and deceleration forces exerted on the parison. This could cause a tubular parison to oscillate like a pendulum thereby causing deformation of the parison during the transfer and also preventing or at least inhibiting proper placement of the lower end of the parison onto the lower clamp at the mold.

Thus, there exists a need for improving the means for transferring parisons which overcome the disadvantages now existing in the art.

SUMMARY OF THE INVENTION

Thus, it is purpose of the present invention to provide a new and improved method and apparatus for transferring parisons to a mold which will overcome the disadvantages existing in the prior art.

This purpose of the present invention is achieved by providing a transfer means for transferring heated parisons wherein a carriage having a picker means adapted to hold a heated parison is moved during the transferring operation under the action of a power means which is operatively connected to the carriage via a displacement multiplication means such that the carriage moves a significantly greater distance than the main actuated element of the power actuated means, as a result of which a longer and faster transfer is accomplished with a relatively small power means. Further, a characteristic of the displacement multiplication means is that the acceleration and deceleration distance of the power means is also multiplied by the displacement ratio of the displacement multiplication means so that the actual acceleration and deceleration distance of the parison at the beginning and end of the transferring movement is spread out, thereby minimizing the adverse effect of high acceleration and deceleration forces thereon.

In accordance with a preferred embodiment of the present invention, a conventional power means such as a piston and cylinder unit is operatively connected to the carriage through a pair of coaxial connected gears of different size, the larger gear engaged with a rack operatively connected to the carriage to effect greater movement thereof as compared with relative movement between the piston and cylinder.

In a preferred arrangement, the carriage is mounted for linear movement along a shaft which forms part of a carriage mounting means, which carriage mounting means is itself movable perpendicular to the direction of travel of the carriage therealong so that movement of the carriage in all directions in a given plane can be achieved. For example, the carriage may be mounted for movement along its shaft in a horizontal direction with the carriage mounting means mounted on a fixed frame for vertical movement therealong.

Thus, it is an object of this invention to provide a new and improved parison transfer means which overcomes disadvantages existing heretofore.

It is still another object of this invention to provide a new and improved means for transferring heated parisons over a relatively large distance wherein the speed of transfer is increased without a proportionate increase in the level of adverse acceleration and deceleration forces exerted on the parison.

It is still another object of this invention to provide an apparatus for transferring a heated tubular parison from an oven to a mold which will move the parison rapidly while inhibiting pendulum like swinging movements of the parison during the transfer.

It is still another object of this invention to provide a transfer apparatus for heated parisons comprising a carriage movable over a given path between a heating means such as an oven and a mold under the action of a power actuated means which is connected with the carriage via a displacement multiplication means whereby the carriage will move a greater distance than the actuated element of the power means.

It is still another object of this invention to provide a transfer apparatus for transferring heated parisons including a carriage movable along a path and including means for holding parisons, a power actuated means, and a displacement multiplication means in the form of a pair of nested gears for transferring the movements of the power actuated means to the carriage.

Other objects and advantages of the present invention will become apparent from the detailed description to follow, taken together with the accompanying drawings.

BRIEF DESCRIPTION OF THE DRAWINGS

There follows a detailed description of a preferred embodiment of the invention which is to be read together with the accompanying drawings in which.

DETAILED DESCRIPTION OF THE PREFERRED EMBODIMENT

Figure 1:
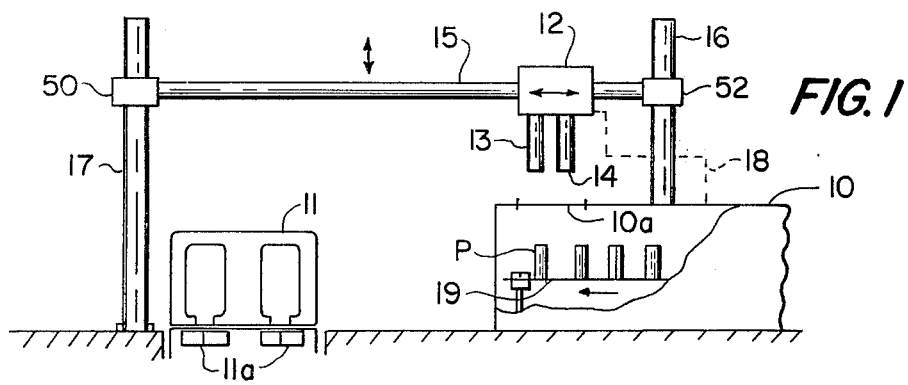
FIG. 1 is a schematic elevational view, partially cut away, showing a portion of a cold parison blow molding apparatus incorporating the features of the present invention.

Referring now to the drawings, like numerals represent like elements throughout the several views.

Referring to FIG. 1, there is shown schematically a parison heating oven 10 in which parisons P are mounted on carrier pins in an upright position for movement along a conveyor 19 which may be an endless chain or the like. FIG. 1 illustrates a portion of the oven 10 whereat the parisons move beneath a discharge opening 10a whereat picker means can be lowered into the oven to grasp and remove heated parisons. A carriage 12, having mounted thereon a pair of picker means 13 and 14, each adapted to grasp and remove a separate parison, is movable horizontally along cross shaft 15, and the cross shaft 15 is in turn operatively connected to upright posts 16 and 17 at end guide numbers 50 and 52 for vertical movement therealong. Movements of the carriage 12 can be synchronized with movements of the conveyor 19 by synchronization means which are not shown but which are represented schematically by the dotted line 18. Mechanical synchronization means are preferred although electrical means can also be used.

Also shown in FIG. 1 is one half of a blow mold 11 revealing a pair of cavities and below each cavity a lower clamp 11a. In the manner as described in the said preceding patent, each of these lower clamps are constructed to receive and firmly hold the lower end of a parison being molded in the mold recess immediately thereabove. Also, in the embodiment as shown and described in said patent, the lower clamps are thread clamps constructed to form a thread at the lower end of the parison, which thread will of course become the threaded opening of a bottle, and means are also provided for introducing the blowing air through these lower clamps directly in to the lower end of the parison positioned thereabove.

Figure 2:
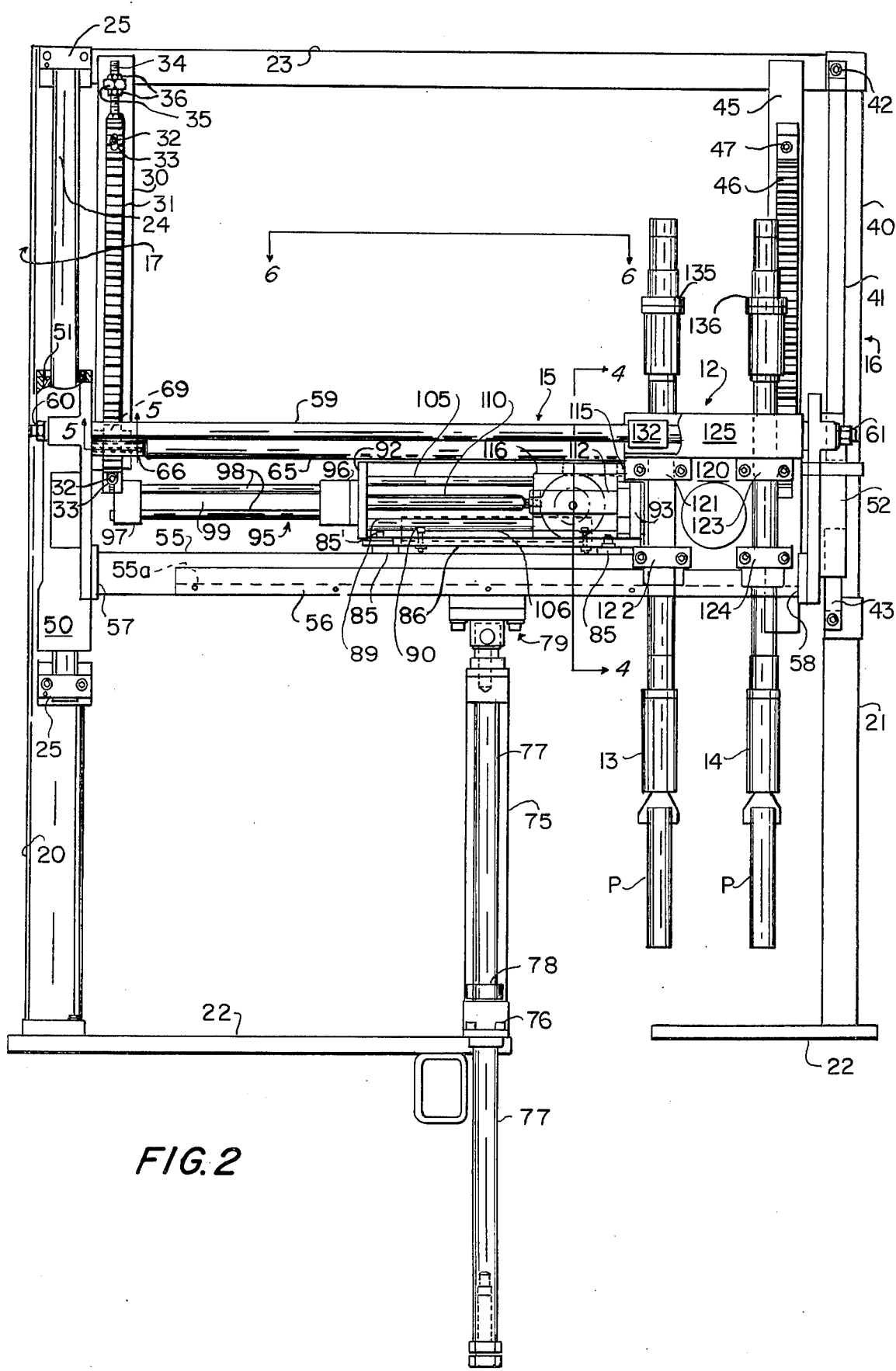
FIG. 2 is an enlarged elevational view of the transfer apparatus of FIG. 1.
Figure 3:
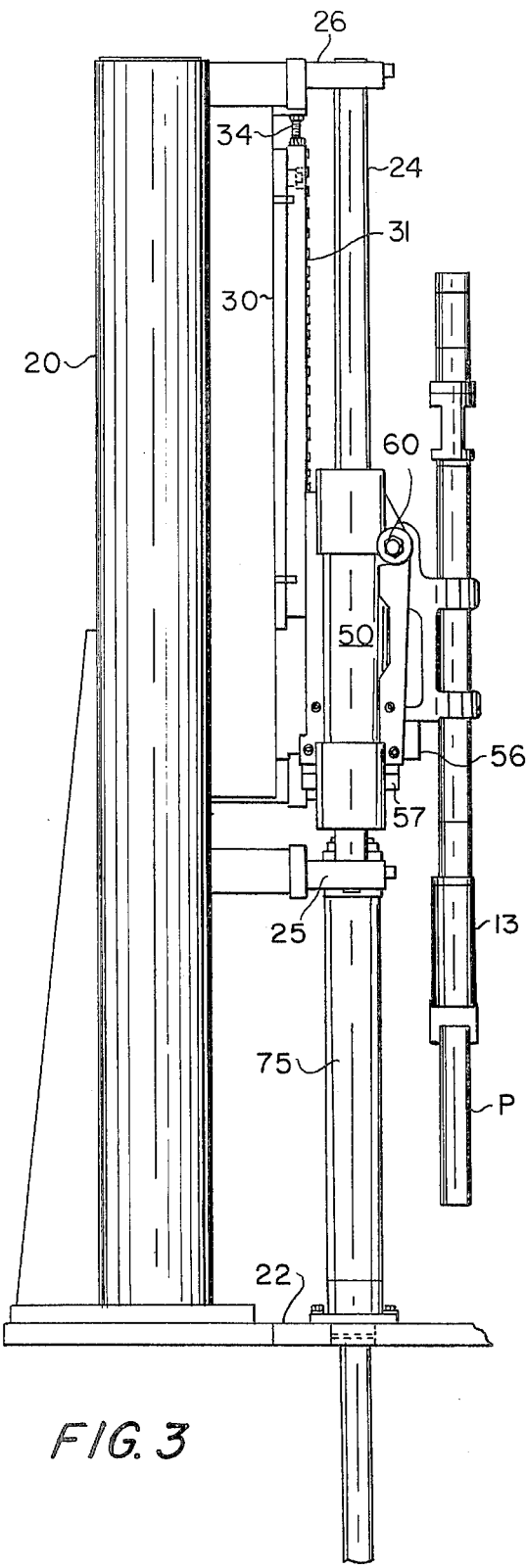
FIG. 3 is a left side elevational view of FIG. 2.

Referring now to FIGS. 2 through 6, a preferred embodiment of the parison transfer means is shown in greater detail. Referring in particular to FIGS. 2 and 3, the upright posts 16 and 17 comprise upright frame posts 20 and 21 securely mounted on a base 22. These upper frame posts are further connected together by an upper cross piece 23. A guide rod 24 is mounted on frame post 20, secured thereto by clamps 25 and 26. A bracket 30 is secured to the frame adjacent the guide rod 24 and has fixed thereon a toothed rack 31 by means of bolts 32 passing through elongated slots 33 in the rack 31. To provide a precise vertical positioning of this rack 31, the slots 33 are elongated and the rack 31 includes at the upper end thereof a threaded rod 34 which passes through a support 35 fixed to the bracket 30, the elements 31 and 34 being finally positioned relative to the bracket 30 by means of nuts 36.

On the opposite side, the upright post 16 comprises an upright post 40 secured at its upper end to cross piece 23 and secured at its lower end to the base 22. A guide rod 41 is attached to the upright post 40, secured thereto at its upper end by means of bracket and bolt connection 42 and at its lower end by means of bracket and bolt connection 43. The guide rods 24 and 41 would normally have a circular cross-section but it might be preferable to construct the guide rod 41 with a square cross-section. Adjacent the guide rod 41 is a bracket 45 fixed to the frame and having fixedly mounted thereon a toothed rack 46 by means of bolts 47.

The means for mounting the carriage 12 on the upright means 16 and 17 comprises an end guide member 50 mounted on and slidable along guide rod 24 and including a bushing 51 to facilitate such movement and a further end guide member 52 mounted on the guide rod 41 for movement therealong.

Figure 4:
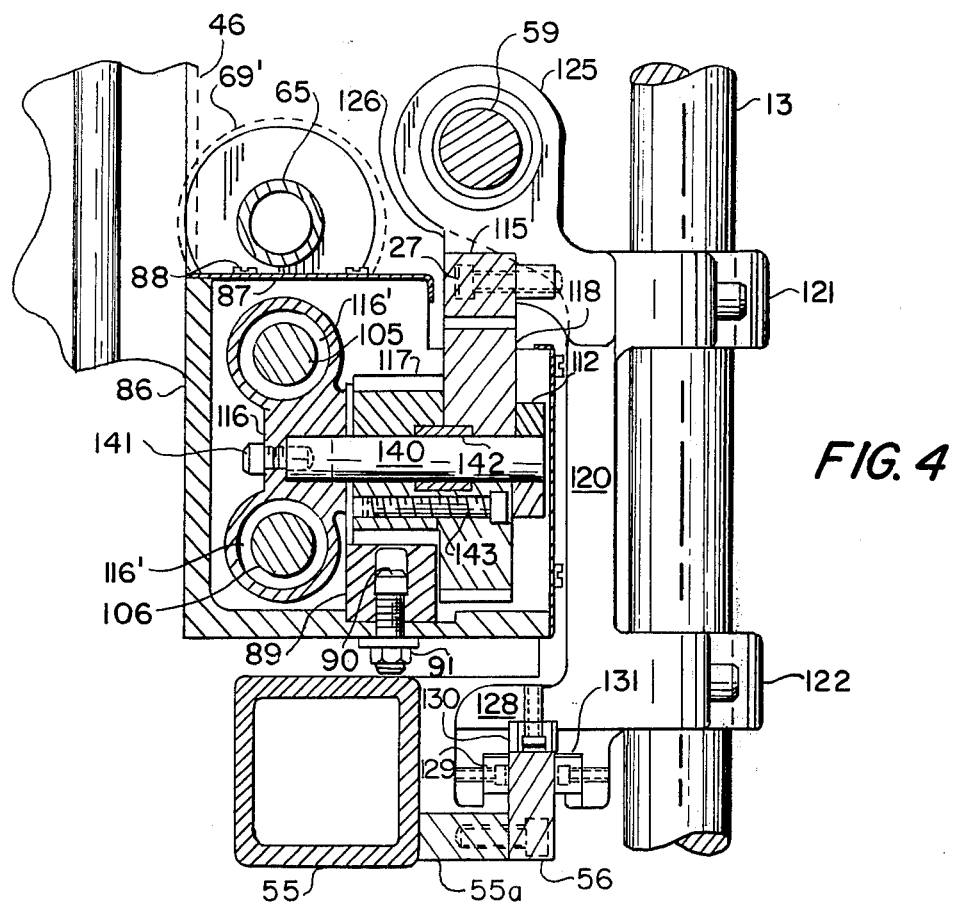
FIG. 4 is an enlarged partial cross-sectional view taken along line 4—4 of FIG. 2.

Extending between the members 50 and 52 is a main support rail 55 secured at its ends to the members 50 and 52 at brackets 57 and 58, respectively. Referring now to FIG. 4 as well as FIGS. 2 and 3, an auxiliary rail 56 extends parallel to the rail 55 and is connected thereto and spaced therefrom by connecting pieces 55a.

Also extending between the members 50 and 52 is a slide shaft 59 secured at one end to the member 50 by nut and bolt connection 60 and secured at its other end to the member 52 by means of nut and bolt connection 61.

Figure 5:
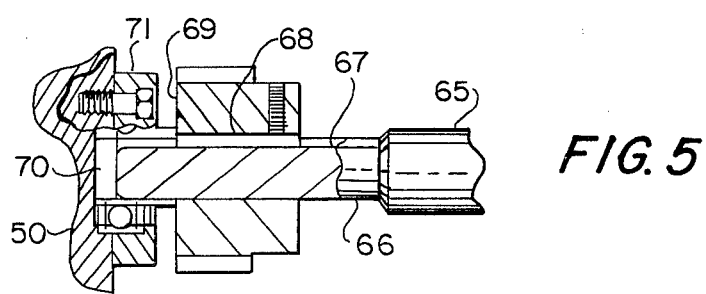
FIG. 5 is an enlarged cross-sectional view showing a detail of FIG. 2 and taken along line 5—5 of FIG. 2.

A cross shaft 65 also extends between and is connected to the end members 50 and 52. The ends of this shaft 65 are essentially identical to each other so that only one end thereof, namely the left-hand end as viewed in FIG. 2 will be described in detail. Referring now to FIG. 5 as well as FIG. 2, each end of shaft 65 includes a reduced diameter end portion 66 having a keyway 67 extending therealong and receiving therein a spline 68 of a toothed gear 69. This gear 69 meshes with the teeth of rack 31 so as to positively position the entire carriage mounting means upon vertical movement thereof. The outer end of reduced end portion 66 is received in recess 70 formed in the member 50 and also within a bracket 71 secured to the member 50 at this point for holding the said end 66 of the shaft 65.

Vertical movement of the entire carriage mounting means is provided by hydraulic means including for example a cylinder 76 which may be an air cylinder mounted at its lower end to the base 22 by connecting means 76 and may include therein a piston 78, the upper end of rod 77 of which is connected by means 79 to the bottom of rail 55.

Horizontal movement of the carriage 12 is provided by power received from a piston and cylinder unit acting via a displacement multiplication means. These elements will now be described with respect to FIGS. 2, 4 and 6. A pair of blocks 85 are attached to the rail 55 by means of bolts 85' (see FIG. 2). Fixed to these blocks 85 is a housing 86 which is L-shaped when viewed in transverse cross-section (see FIG. 4) and includes a lid 87 covering most of the upper portion thereof. End plates 92 and 93 are fixed to the opposing ends of the L-shaped housing 86, and bolts 88 are secured into the tops of these end plates 92 and 93 for securing the lid 87 onto at least the left-hand portion (as viewed in FIG. 6) of the housing 86. An elongated toothed rack 89 is fixed along the bottom of the housing 86 and is secured thereto by a bolt 90 (see FIG. 4) which includes a nut 91 at its lower end.

Figure 6:
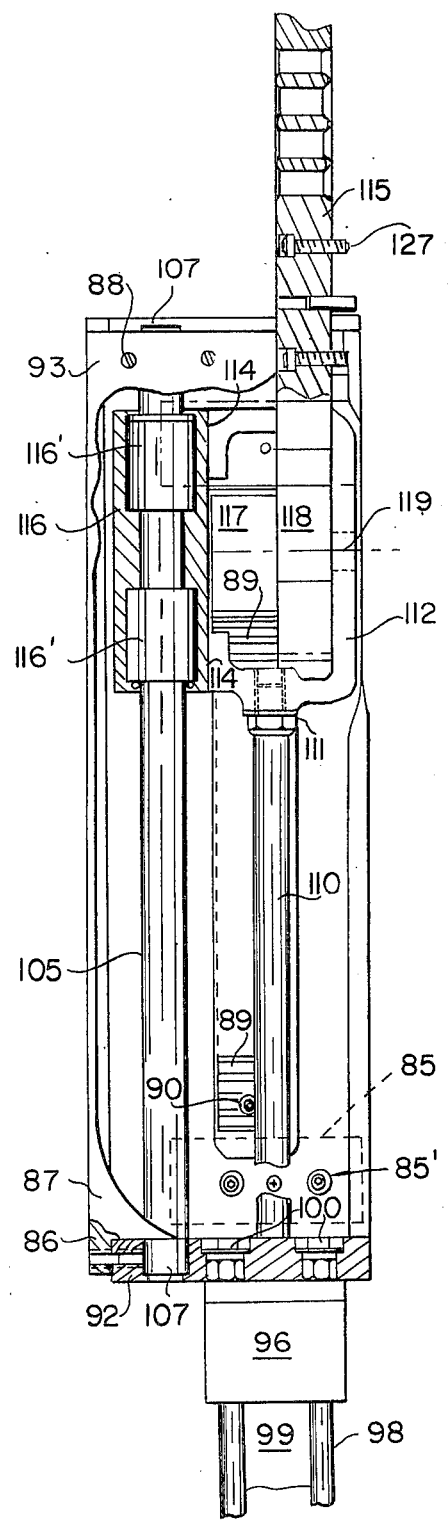
FIG. 6 is an enlarged partial plan view, partially cut away, and taken along line 6—6 of FIG. 2.

A hydraulic cylinder indicated generally at 95 comprises a pair of heads 96 and 97 connected together by a plurality such as four tie rods 98 to secure therebetween a cylinder 99. Referring to FIG. 6, the cylinder head 96 is fixedly secured to the end plate 92 by means of bolts 100. The cylinder is then in effect cantilevered to the left from its connection with the plate 92. Also connected to the end plates 92 and 93 of the housing 86 are a pair of guide rods 105 and 106, the ends of rod 106 being visible at 107 in FIG. 6.

A piston rod 110 extends outwardly to the right (FIG. 2) from the cylinder 99 and this in essence constitutes the actuated element of the power means and is connected to the displacement multiplication means so as to cause the carriage 12 to move linearly a greater distance than the rod 110 itself. This rod 110 is connected to a yoke 112 by means including a threaded end and a nut 111 whereby the rod 110 can be adjusted linearly relative to the yoke 112 to thereby permit slight linear adjustment between the elements 110 and 112.

Referring to FIG. 6, as viewed from above, the yoke 112 is essentially a closed loop including a right-hand part which is in the shape of a reverse C, the ends of this reverse C indicated at 114 whereat this portion joins with a guide block portion 116 with which the yoke portion 112 is preferably integral. This guide block 116 includes bushings 116' adapted to engage the guide rods 105 and 106 for sliding movement therealong. Extending across from the right-hand portion of the yoke 112 to the block 116 (as viewed in FIGS. 4 and 6) is a pivot pin 140 operatively connected at its right end to the yoke 112 and operatively connected at its other end to the block 116 by means of a bolt 141. Mounted on this pin are a pair of gears including a small gear 117 and a larger 118, these gears being fixed together by suitable means such as bolts 143 and adapted to rotate about pin 140, for example with the assistance of bushing 142.

In FIG. 6 the axis of pin 140 is indicated at 119, and the upper right-hand portion of this figure shows a section through the rack 115. As best illustrated in FIG. 4, the large gear 118 meshes with rack 115 of the carriage 12 while the smaller gear 117 meshes with the rack 89 fixed to the carriage mounting structure.

Referring now to FIGS. 2, 3 and 4, the carriage 12 comprises a central part 120, a pair of clamps 121 and 122 for securing the picker rod 13 and a pair of clamps 123 and 124 for securing the picker rod 14. These picker rods 13 and 14 include pneumatic piston and cylinder means 135 and 136 at their upper ends for controlling opening and closing of the gripper fingers thereof. Details of arrangements for controlling picker fingers by means of air cylinders located thereabove are shown in detail in said copending commonly owned applications. By simply loosening the clamps 121 and 122, one can adjust the vertical position of picker rod 13 so as to adjust for parisons of different sizes. Similarly, clamps 123 and 124 can be loosened to adjust the position of picker rod 14.

At its upper end the carriage 12 includes an upper part 125 having a recess therein for receiving the shaft 59 and an upper flange 126 to which the rack 115 is secured by connecting means 127. At its lower end the carriage includes a lower flange 128 having three bearing blocks 129, 130 and 131 which engage the auxiliary rail 56.

The dimensions of the apparatus will of course change for different applications thereof and one skilled in the art, using the teachings of the present application will be able to provide the correct dimensions. However, as one example, it was desired to provide a carriage stroke of 25 inches utilizing a hydraulic piston and cylinder stroke of 8.33 inches. The displacement ratio which in this case would be 3 is determined by adding one to the ratio of the diameter of the large gear over the ratio of the small gear. In this example the small gear was given a diameter at the pitch circle of 1.5 inches and the large gear a diameter at the pitch circle of 3.0 inches. The ratio of the large gear diameter to the small gear diameter is then 2 so that the displacement multiplication ratio would be 3, thereby providing a carriage stroke of 25 inches for a stroke of 8.33 inches at the hydraulic piston and cylinder means. It will further be noted that the displacement multiplication ratio can easily be varied by simply changing the ratio of the two gears, thereby simplifying the overall construction of the apparatus by allowing design flexibility in the selection of the various elements such as the piston and cylinder means so that a stock piston and cylinder means can then be employed.

It is a further feature of the invention, as noted above, that the distance over which the carriage accelerates and decelerates is also multiplied by the displacement multiplication factor so that if for example maximum acceleration at cylinder 99 occurs during the first two inches thereof then acceleration at the carriage would occur during the first 6 inches thereof. The same principle applies with respect to deceleration. Hence, instantaneous forces of acceleration on the carriage and hence also on the parisons are minimized as compared to the forces which would be exerted if the piston were connected directly to the carriage, instead of through the displacement multiplication means, and had to accelerate to full speed in its first 2 inches of travel. As a result thereof, the parisons can be swiftly moved from the oven to the mold maintained essentially vertical so that they can be properly positioned at the mold; and of course the more rapid transfer minimizes the difficulty of the parison losing heat during the transfer.

Although the operation of the invention will be apparent from the above description of the apparatus, for continuity the operation will be briefly described below. Referring to FIGS. 1 and 2, when a pair of parisons are positioned beneath the discharge opening 10a, the entire carriage mounting means will be lowered by means of piston and cylinder unit 75 and 77, permitting the members 50 and 52 to slide along their respective guide rods 24 and 41 until the lower ends of picker rod 13 and 14 enter the oven and grasp the two parisons positioned therebelow. As explained in the said previous patent, it is a definite advantage if the conveyor 19 can continue moving continuously, even during the step of removing parisons from the oven. To accomplish this, as the carriage 12 is in its lowered position with its picker rods about to grasp heated parisons, the carriage 12 is moved horizontally along shaft 59 at the same speed as conveyor 19. As the parisons are finally gripped, piston and cylinder means 75 is operated to raise the carriage mounting means 12 until the parisons clear the top of oven 10 whereupon piston and cylinder means 99, 110 is operated to move the carriage 12 to the left until the carriage is positioned over the mold 11. At this time or if desired even before this time the means 75 will be operated to lower the carriage mounting means bringing the lower ends of the parisons into engagement with the lower clamp means 11a. Power means 75 is then operated to raise the carriage 12 with the upper ends of the parisons still held by the picker rods 13 and 14. The purpose of this is to stretch the parisons, thereby biaxially orienting them. At the end of this stretching operation the lower ends of picker rods 13 and 14 will be located above the top of mold 11, whereupon mold 11 will close onto the parisons and the parisons will be blow therein. This closing of the molds will sever the parison, leaving scrap upper pieces held by the picker rods 13 and 14, which scrap pieces can then be dropped into a suitable receptacle, for example during the travel of the carriage 12 back to the oven.

Although the invention has been described in considerable detail with respect to a preferred embodiment thereof, it will be apparent that the invention is capable of numerous modifications and variations apparent to those skilled in the art without departing from the spirit and scope of the invention, as defined in the claims.

We claim:

1. In combination with a parison heating oven and a mold for forming the parison into a finished article, a transfer means for transferring heated parisons from the oven to the mold, said transfer means comprising:
   a carriage,
   picker means mounted on the carriage operative to grasp a heated tubular parison at an upper portion thereof and remove said parison from the oven while holding the same in a substantially vertical plane during transfer to the mold,
   means moving the carriage along a given path between the oven and the mold, said path being straight and horizontal, said carriage being mounted on a horizontally extending structure for horizontal movement therealong between the oven and the mold, and said horizontally extending structure including gear means mounted to engage a toothed rack on a frame means, said gear means and the toothed rack cooperating to provide guidance for vertical movement of the horizontally extending structure therealong, whereby the picker means is movable simultaneously both horizontally and vertically by movement of the carriage on the horizontally extending structure and by vertical movement of the horizontally extending structure on the frame means, respectively,
   power actuating means including a movable actuated element operatively connected to the carriage and having at least a component of movement substantially parallel to said given path to cause movement of the carriage along said path,
   and including a displacement multiplication means operatively interconnecting the actuated element with the carriage such that the carriage and hence also the picker means and the parison carried thereby are moved a greater distance along said path than the said component of movement of the actuated element is moved parallel to said path during any given movement of said actuated element.

2. The invention of claim 1, including a fluid operated unit comprising a cylinder and piston slidable in the cylinder, one of said piston or cylinder connected to the horizontally extending structure and the other of the piston or cylinder constituting the actuated element connected to the displacement multiplication means.

3. The invention of claim 2, said displacement multiplication means comprising a pair of coaxial gears of different sizes, the smaller gear engaging a rack on the horizontally extending structure, and the larger gear engaging a rack operatively connected to the carriage.

4. The invention of claim 3, the gear ratio of said gears being sufficiently large to provide a displacement multiplication ratio of the carriage relative to the said component of the actuated element of greater than 2.

5. The invention of claim 3, said gears being adjustable towards and away from the actuated element to provide limited adjustment of the length of movement of the carriage relative to the actuated element.

6. The invention of claim 3, said picker means comprising at least one picker rod having fingers thereon for grasping parisons, said picker rod being adjustable vertically relative to the carriage.

7. The invention of claim 1, said displacement multiplication means comprising a pair of coaxial gears mounted for movement together and movable in a direction substantially parallel to said path under the action of said actuated element, the larger of said gears operatively connected to the carriage.

8. The invention of claim 7, and said power actuated means comprising a fluid operated unit having a cylinder and a piston slidable in the cylinder, one of said piston or cylinder fixed against movement parallel to said path, and the other of the piston or cylinder being movable and constituting said actuated element operatively connected to said gears.

9. The invention of claim 8, said means mounting the carriage further mounting said fluid operated unit, and the said one of the piston or cylinder fixed thereto.

10. The invention of claim 9, said fluid operated unit being a hydraulic piston and cylinder unit.

11. The invention of claim 9, said cylinder being fixed to the means for mounting the carriage, the piston being the actuated element operatively connected to the gears.

12. The invention of claim 1, said actuated element having a certain acceleration and deceleration characteristic for a given acceleration and deceleration movement of the power actuated means, and said displacement multiplication means constructed to increase the distance of the acceleration and deceleration of the carriage relative to the acceleration and deceleration distance of the actuated element itself.

13. The invention of claim 12, said power actuated means being a fluid operated unit.

14. The invention of claim 13, said displacement multiplication means comprising a pair of coaxial gears mounted for rotation together and of different sizes and movable in a direction substantially parallel to said path under the action of the actuated element, the larger of said gears being operatively engaged with the carriage.

15. The invention of claim 1, said means for mounting the carriage comprising a straight shaft along which the carriage slides under the action of said power actuated means, said actuated element and the displacement.

16. The invention of claim 15, including a second shaft on the means for mounting the carriage including said gears which engage a said toothed rack.

17. The invention of claim 1, said oven including means for moving the parisons therethrough, and including means for synchronizing movement of the carriage with movement of the parisons in the oven.

18. The invention of claim 1, including at least one fixed guide rod, a yoke connected to said actuated element for movement therewith, said yoke mounted for movement along said guide rod, and said displacement multiplication means comprising a pair of different sized gears fixed for rotation together to said yoke, one of said gears being operatively engaged with the means for mounting the carriage, and the other being operatively engaged with the carriage.

* * * * *

UNITED STATES PATENT AND TRADEMARK OFFICE
CERTIFICATE OF CORRECTION

PATENT NO. : 4,011,039
DATED : March 8, 1977
INVENTOR(S) : David C. Oas & Waldemar E. Kmentt It is certified that error appears in the above-identified patent and that said Letters Patent are hereby corrected as shown below:

Column 10, line 19, after "displacement", add --multiplication means.--.

Signed and Sealed this

Thirty-first Day of May 1977

[SEAL]

Attest:

RUTH C. MASON
*Attesting Officer*

C. MARSHALL DANN
*Commissioner of Patents and Trademarks*